United States Patent
Chifor et al.

(10) Patent No.: US 11,539,682 B2
(45) Date of Patent: Dec. 27, 2022

(54) CONNECTION PARAMETER AWARENESS IN AN AUTHENTICATED LINK-LAYER NETWORK SESSION

(71) Applicant: LENOVO ENTERPRISE SOLUTIONS (SINGAPORE) PTE. LTD., Singapore (SG)

(72) Inventors: Bogdan-Cosmin Chifor, Bucharest (RO); George-Andrei Stanescu, Ploiesti (RO); Radu Mihai Iorga, Bucharest (RO); Corneliu-Ilie Calciu, Bucharest (RO)

(73) Assignee: LENOVO ENTERPRISE SOLUTIONS (SINGAPORE) PTE. LTD., Singapore (SG)

( * ) Notice: Subject to any disclaimer, the term of this patent is extended or adjusted under 35 U.S.C. 154(b) by 303 days.

(21) Appl. No.: 16/836,474

(22) Filed: Mar. 31, 2020

(65) Prior Publication Data

US 2021/0306311 A1    Sep. 30, 2021

(51) Int. Cl.
H04L 9/40 (2022.01)
(52) U.S. Cl.
CPC .......... *H04L 63/08* (2013.01); *H04L 63/0428* (2013.01); *H04L 63/20* (2013.01)
(58) Field of Classification Search
CPC ... H04L 63/162; H04L 63/20; H04L 63/0428; H04L 63/08; H04L 41/0893
USPC .......................................................... 726/1
See application file for complete search history.

(56) References Cited

U.S. PATENT DOCUMENTS

| | | | |
|---|---|---|---|
| 8,281,371 B1* | 10/2012 | Chickering | H04L 63/164 713/180 |
| 2007/0113284 A1* | 5/2007 | O'Rourke | H04L 63/0227 726/23 |
| 2020/0128087 A1* | 4/2020 | Yu | H04M 7/126 |
| 2022/0053332 A1* | 2/2022 | Venkatachalam | H04W 12/068 |

OTHER PUBLICATIONS

Mccarthy, "QoS Negotiation in Real-Time Systems", URL: http://www.cse.wustl.edu/~lu/cse520s/slides/rtpool.pdf, retrieved Dec. 2, 2019, 4 pages.
Rothermel et al., "QoS negotiation and resource reservation for distributed multimedia applications", Proceedings of IEEE International Conference on Multimedia Computing and Systems, Ottawa, Ontario, Canada, DOI: 10.1109/MMCS.1997.609619, Date Added to IEEE Xplore: Aug. 6, 2002, 8 pages.

* cited by examiner

*Primary Examiner* — Benjamin A Kaplan

(57) ABSTRACT

Methods, apparatuses, and computer programs products for connection parameter awareness in an authenticated link-layer network session are disclosed. A client sends, to a network access server (NAS), an initiation packet announcing the initiation of an authentication session. The client establishes an authenticated link-layer session with the NAS. The client receives, from the NAS, a network policy packet including a network policy defined by one or more connection parameters for the link-layer session. The client then enforces the network policy.

17 Claims, 10 Drawing Sheets

CONNECTION PARAMETER AWARENESS IN AN AUTHENTICATED LINK-LAYER NETWORK SESSION

BACKGROUND

Field of the Invention

The field of the invention is data processing, or, more specifically, methods, apparatus, and products for connection parameter awareness in an authenticated link-layer network session.

Description of Related Art

In the Open Systems Interconnection model (OSI model), layer 2 (i.e., the data link layer) provides node-to-node data transfer and defines the protocol to establish and terminate a connection between two connected devices, as well as protocols for data traffic between the nodes. Conceptually, the link-layer may include sublayers including a Medium Access Control (MAC) layer controlling how clients gain access to a network and permission to transmit data, and a Logical Link Control (LLC) layer identifying and encapsulating network layer protocols. Various protocols are used in establishing a link-layer session.

A link-layer authentication protocol is used to establish an authenticated link-layer session between two nodes. In such protocols, a device such as a client communicates with a gateway such as a network access server (NAS) to gain access to protected network resources. An authentication authority may be used by the gateway to authenticate the client device.

SUMMARY

An embodiment in accordance with the present invention is directed to a method of connection parameter awareness in an authenticated link-layer network session, including sending, by a client to a network access server (NAS), an initiation packet announcing the initiation of an authentication session, establishing, by the client, an authenticated link-layer session with the NAS, receiving, by the client from the NAS, a network policy packet including a network policy defined by one or more connection parameters for the link-layer session, and enforcing, by the client, the network policy.

Another embodiment in accordance with the present invention is directed to an apparatus for connection parameter awareness in an authenticated link-layer network session, the apparatus comprising a computer processor, a computer memory operatively coupled to the computer processor, the computer memory having disposed within it computer program instructions that, when executed by the computer processor, cause the apparatus to carry out the steps of sending, by a client to a network access server (NAS), an initiation packet announcing the initiation of an authentication session, establishing, by the client, an authenticated link-layer session with the NAS, receiving, by the client from the NAS, a network policy packet including a network policy defined by one or more connection parameters for the link-layer session, and enforcing, by the client, the network policy.

Yet another embodiment in accordance with the present invention is directed to computer program product for connection parameter awareness in an authenticated link-layer network session, the computer program product disposed upon a computer readable medium, the computer program product comprising computer program instructions that, when executed, cause a computer to carry out the steps of sending, by a client to a network access server (NAS), an initiation packet announcing the initiation of an authentication session, establishing, by the client, an authenticated link-layer session with the NAS, receiving, by the client from the NAS, a network policy packet including a network policy defined by one or more connection parameters for the link-layer session, and enforcing, by the client, the network policy.

In various embodiments, the client may determine whether the network policy can be enforced and notify the NAS, in dependence upon the determination, whether the network policy will be enforced. In various embodiments, the client may include an authentication process and one or more applications, and determining, by the client, whether the network policy can be enforced may include providing, by the client authentication process, the one or more connection parameters to the one or more applications and receiving, by the client authentication process from the one or more applications, acceptance of the one or more connection parameters. Further notifying the NAS, in dependence upon the determination, whether the network policy will be enforced may include, when it is determined that the client cannot enforce the network policy, requesting the NAS to close the authenticated link-layer session. Enforcing, by the client, the one or more network policies may further include providing, by the client authentication process, the one or more connection parameters to at least one application and negotiating, by the at least one application, application protocol parameters with another application on a second client.

In various embodiments, the initiation packet and the network policy packet each include a cryptographic seal. The network policy may be a traffic policy and the one or more connection parameters includes at least one of a bandwidth parameter, a quality-of-service (QoS) parameter, a virtual local area network (VLAN) parameter, and a layer 2 tunneling protocol (L2TP) parameter.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

Figure 1:
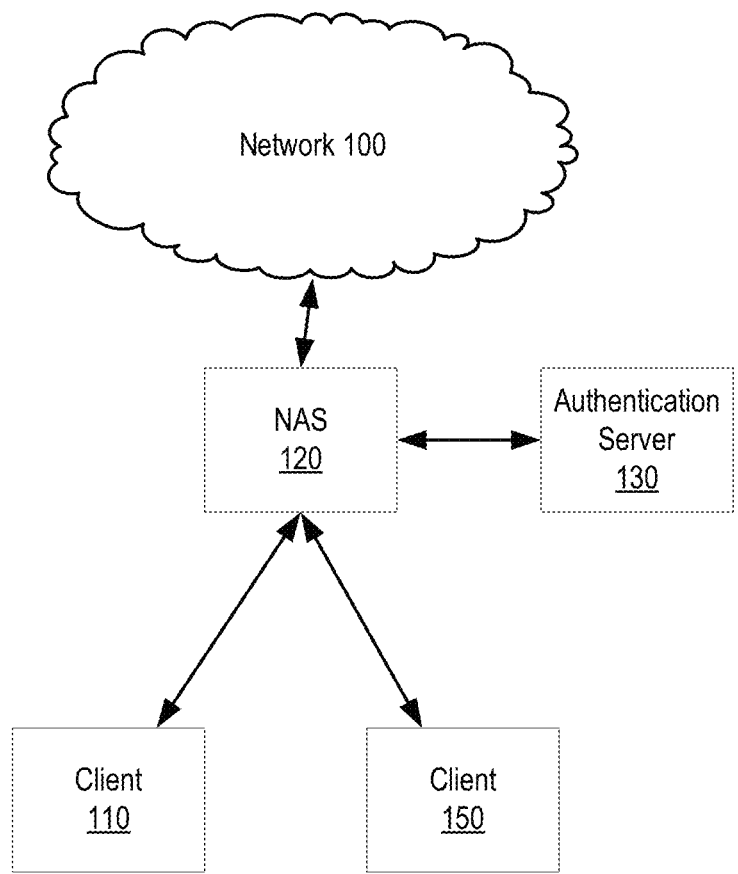
FIG. 1 is an exemplary network diagram of a system configurable according to embodiments of the present invention.

Exemplary methods, apparatus, and products for connection parameter awareness in an authenticated link-layer network session in accordance with the present invention are described with reference to the accompanying drawings, beginning with FIG. 1. FIG. 1 sets forth a network diagram of a system configured for connection parameter awareness in an authenticated link-layer network session according to embodiments of the present invention. The system of FIG. 1 includes a network access server (NAS) (120) that acts as a gateway to a protected resource such as the network (100) for client devices such as client (110) and client (150). To authenticate the clients (110, 150), the NAS (120) communicates with an authentication server (130) to authenticate credentials supplied by the clients (110, 150), and to receive a network policy for the clients (110, 150) that the NAS (110) will enforce. The network policy defines access to various protected resources and places conditions and constraint on that access. To establish communication with the NAS (110) and ultimately the network (100), the clients (110, 150) initiate a link-layer authentication session, the link-layer referring to the layer 2 data link layer of the Open Systems Interconnection (OSI) model. In the foregoing, connection parameter awareness in an authenticated link-layer network session in accordance with embodiments of the present invention is described.

The arrangement of servers and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

connection parameter awareness in an authenticated link-layer network session in accordance with the present invention is generally implemented with computers, that is, with automated computing machinery. In the system of FIG. 1, for example, all the client (110), client (150), NAS (120), and authentication server (130) are implemented to some extent at least as computers. For further explanation, therefore, FIG. 2 sets forth a block diagram of automated computing machinery comprising an exemplary computer (152) configured for connection parameter awareness in an authenticated link-layer network session according to embodiments of the present invention. The computer (152) of FIG. 2 includes at least one computer processor (156) or 'CPU' as well as random access memory (168) ('RAM') which is connected through a high speed memory bus (166) and bus adapter (158) to processor (156) and to other components of the computer (152).

Stored in RAM (168) is an authentication process (315), a module of computer program instructions improved for connection parameter awareness in an authenticated link-layer network session according to embodiments of the present invention. Also stored RAM (168) is at least one application (317), a program, process, script, and the like that runs on the exemplary computer (152).

Also stored in RAM (168) is an operating system (154). Operating systems useful in computers configured for connection parameter awareness in an authenticated link-layer network session according to embodiments of the present invention include UNIX™, Linux™, Microsoft XP™, AIX™, IBM's i5/OS™, and others as will occur to those of skill in the art. The operating system (154), client authentication process (315), and the application (317) in the example of FIG. 2 are shown in RAM (168), but many components of such software typically are stored in non-volatile memory also, such as, for example, on a disk drive (170).

Figure 2:
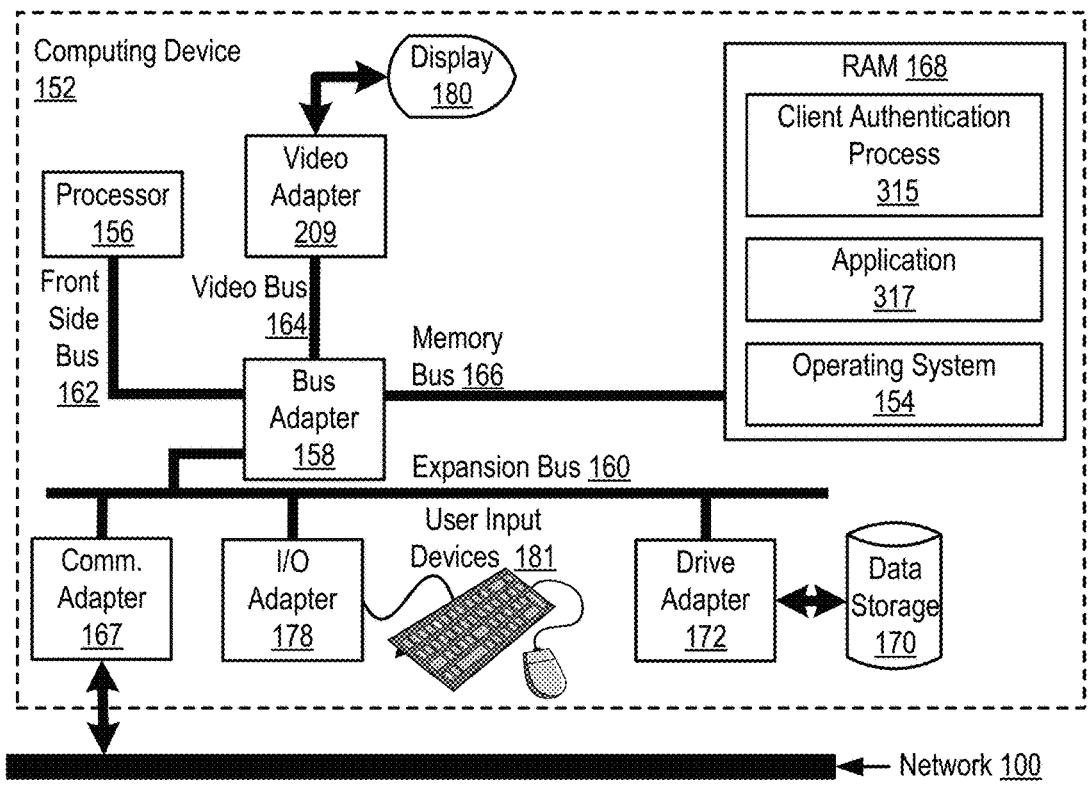
FIG. 2 is a block diagram illustrating an exemplary computer according to embodiments of the present invention.

The computer (152) of FIG. 2 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers configured for connection parameter awareness in an authenticated link-layer network session according to embodiments of the present invention include Integrated Drive Electronics (IDE') adapters, Small Computer System Interface (SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 2 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 2 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computer (152) of FIG. 2 includes a communications adapter (167) for data communications with other computers (182) and for data communications with a data communications network (100). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers configured for connection parameter awareness in an authenticated link-layer network session according to embodiments of the present invention include modems for wired dial-up communications, Ethernet (IEEE 802.3) adapters for wired data communications, and 802.11 adapters for wireless data communications.

Figure 3:
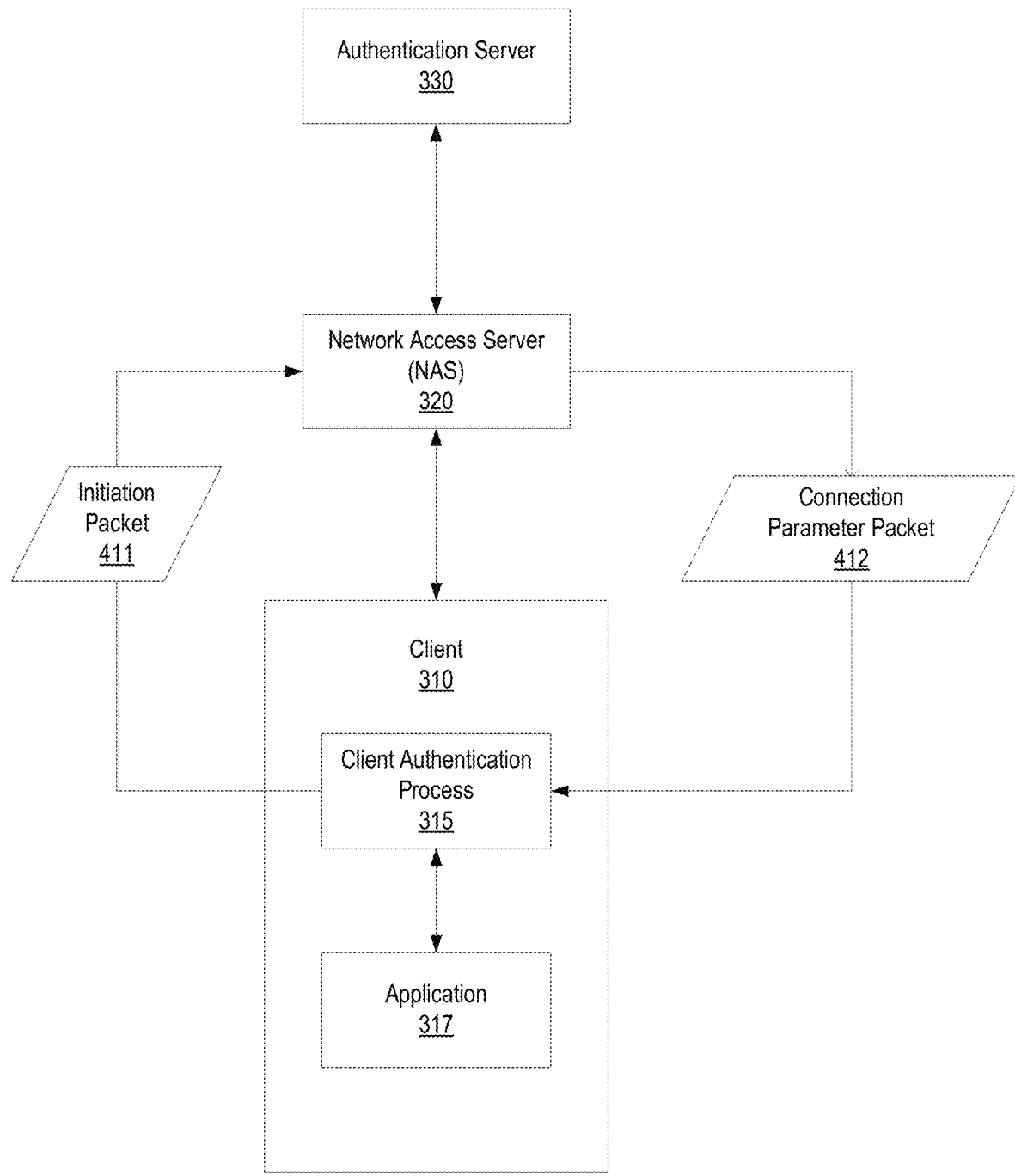
FIG. 3 is a block diagram illustrating an exemplary system according to embodiments of the present invention.

For further explanation, FIG. 3 sets forth a block diagram illustrating an exemplary system for connection parameter awareness in an authenticated link-layer network session according to embodiments of the present invention that includes a client (310), a NAS (320), and an authentication server (330). The NAS (320) provides a gateway to a protected resource, such as the network (100), a cellular communications network, network devices such as printers and storage devices. The NAS (320) accepts requests for access to the protected resource from the client (310) and communicates with the authentication server (330) to determine whether the access request should be granted. An example implementation of the NAS (320) may be a Wi-Fi network provider, where a client attempts connect to the Wi-Fi network or attempts to access a particular resource, such as a network attached printer or the internet, and the NAS of the Wi-Fi provider requests a user name and password, which the NAS authenticates with an authentication provider before granting the requested access to the client. Another example implementation of the NAS (320) is in a cellular communications network, where the NAS of the cellular communications provider authenticates the credentials of a mobile device before granting the device access to the network. Yet another example implementation of the NAS (320) is in an internet service provider (ISP), where the NAS of the ISP requests a user name and password of a customer, which the NAS authenticates with an authentication provider before granting access to the internet. Still another example implementation of the NAS (320) is an NAS for a network of Internet-of-Things (IoT) devices, where the NAS coordinates access among IoT devices to a communications network, where each IoT is authenticated by an authentication authority using, for example, a media access control (MAC) address and a pre-shared key (PSK). The NAS (320) may coordinate network access and authentication based on client credentials such as user name and password, MAC address, IP address, PSK, digital signatures, certificates, and the like. The NAS (320) may partition the client (310) and other clients and network resources into a virtual LAN (VLAN).

The authentication server (330) is an entity that authenticates the credentials of the client (310), which are provided by the NAS (320). The authentication server may be configured as an authentication, authorization, and accounting (AAA) server that will be appreciated by those of skill in the art. Upon authentication of the client (310), the authentication server (330) may provide the NAS (310) with a network policy that defines resources that the client (310) is authorized to access, specific settings that must be implemented for the client (310), and rules for accounting the client's usage of the network access. The network policy is enforced by the NAS (320).

The client (310) may be a device configured in accordance with the exemplary computer (152) of FIG. 2. The client may be, for example, a device such as a laptop or desktop computer, a mobile device such as smart phone or tablet, an IoT device such as manufacturing equipment or smart home devices, and the like. The client (310) includes one or more applications that use the protected resource such as the network (100) or other protected resources previously mentioned. The client (310) also includes computer-executable instructions for sending, by a client to a network access server (NAS), an initiation packet announcing the initiation of an authentication session, establishing, by the client, an authenticated link-layer session with the NAS, receiving, by the client from the NAS, a network policy packet including a network policy defined by one or more connection parameters for the link-layer session, and enforcing, by the client, the network policy. The client authentication process (315) is described below in greater detail.

In a link-layer authentication scenario the NAS (320) intermediates an authentication session between the client (310) and the authentication server (330). At the end of the authentication session, the authentication server (330) can send a list of attributes to the NAS (320) along with the authentication status. These attributes can define the connection parameters for the newly authenticated client (310), thus controlling the client traffic. In such a scenario, the authenticated client (310) is not typically aware of the network policy, such as a traffic policy, enforced by the NAS (320) and this can affect the application functionality. For instance, a real-time application can send packets with a high QoS value (or a high number of packets per second) and these packets may be dropped by the NAS (320) as result of applying the traffic policy received from the authentication server (310). In an authentication process according to embodiments of the present invention, the NAS (320) sends the policies to the client (310), for example, by using a neighboring protocol that encapsulates the data in a type-length-value (TLV) data structure.

Figure 4:
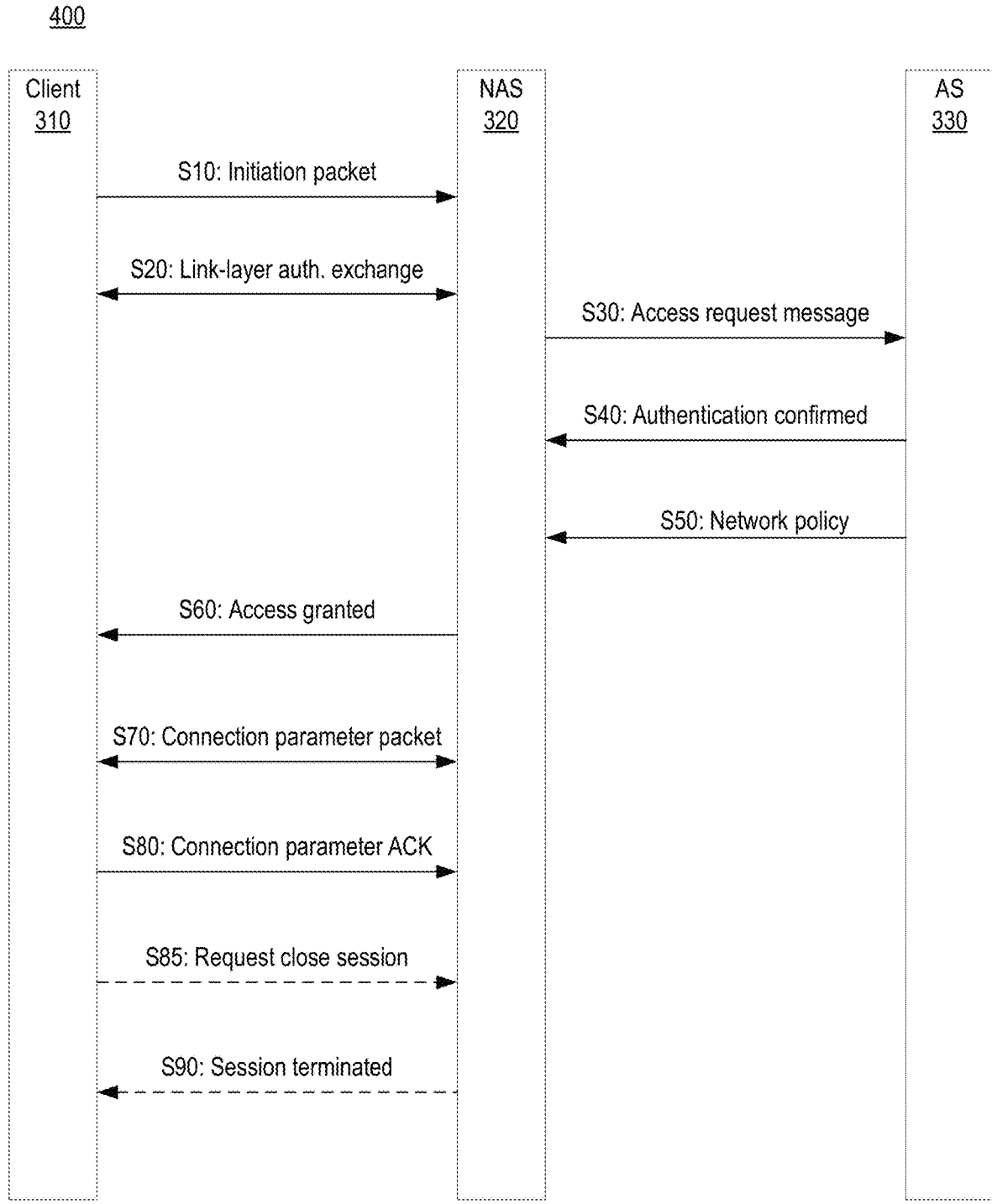
FIG. 4 is a diagram illustrating an exemplary authentication process according to embodiments of the present invention.

For further explanation, FIG. 4 sets forth a diagram illustrating an exemplary authentication process (400) for connection parameter awareness in an authenticated link-layer network session according to embodiments of the present invention and interaction among the client (310), the NAS (320), and the authentication server (330) of FIG. 3. At S10, the client (310) transmits a packet (411) to the NAS (320) in order to announce the start of an authentication session. The packet (411) includes a session identifier, which may be a randomly generated identifier, and a cryptographic seal of the packet. The session identifier and cryptographic seal may each be expressed as a type length value (TLV) data structure. For example, where a pre-shared key (PSK) is used to establish a trust relation, the cryptographic seal may be a hash-based message authentication code (HMAC). As another example, where an asymmetric cryptographic key pair is used for the trust relation, the cryptographic seal may be a digital signature with the client's private key.

At S20, the client (310) and NAS (320) perform a link-layer authentication handshake in which the NAS (320) asks the client (310) to provide credentials that can be authenticated with the authentication server (330) before providing network access to the client, and the client (310) supplies the requested credentials to the NAS (320). The link-layer authentication handshake may be performed using, for example, an extensible authentication protocol (EAP). Examples of EAPs include Lightweight Extensible Authentication Protocol (LEAP), EAP Transport Layer Security (EAP-TLS), EAP-MDS, EAP Protected One-Time Password (EAP-POTP), EAP Pre-Shared Key (EAP-PSK), EAP Password (EAP-PWD), EAP Tunneled Transport Layer Security (EAP-TTLS), EAP Internet Key Exchange (EAP-IKE), EAP Flexible Authentication via Secure Tunneling (EAP-FAST), Tunnel Extensible Authentication Protocol (TEAP), EAP Subscriber Identity Module (EAP-SIM), EAP Authentication and Key Agreement (EAP-AKA), EAP Generic Token Card (EAP-GTC), EAP Encrypted Key Exchange (EAP-EKE) and other link-layer authentication protocols that will occur to those of skill in the art.

At S30, upon receiving credentials from the client (310), the NAS (320) transmits an access request to the authentication server (330) with the client credentials. If the client credential credentials can be authenticated, the authentication server (330) sends a message to the NAS (320) indicating that the client credentials are accepted at S40. At S50, the authentication server (330) provides a certificate to the NAS (320) that authenticates the client (310) and includes a network policy for the client (310). The network policy defines network conditions, restrictions, constraints, and settings for the client (310) that should be enforced by the NAS (320). For example, the network policy may include bandwidth constraints, quality-of-service (QoS) constraints, VLAN settings, layer 2 tunneling protocol (L2TP) settings, connection timeout settings, access restrictions, service restrictions, and other link-layer policies that will be appreciated by those of skill in the art. At S60, the NAS (320) sends a message to the client (310) indicating that network access has been granted in accordance with the link-layer authentication protocol. It will be appreciated by those of skill in the art that the messages and data exchanged in S20-S50 may vary in accordance with the authentication protocol, and an abbreviated description of S20-S60 is presented above for simplicity.

At S70, the NAS (320) transmits a packet (412) to the client (310) that includes connection parameters based on the network policy provided by the authentication server (330) to the NAS (320). The packet (412) also includes the session identifier from packet (411) and the cryptographic seal using, for example, the PSK or the digital signature of the NAS (320) as described above in S10. The connection parameters may include bandwidth parameters, QoS parameters, VLAN parameters, L2TP parameters, access restrictions, service restrictions, and so on. The connection parameters may be encapsulated in a TLV data structure. For example, the network policy that is enforced by the NAS (320) may limit the number of packets per second that can be transmitted by the client (310). In this example, the NAS (320) provides, as a connection parameter, a value of the packets per second transmitted by the client (310) that will be allowed by the NAS (320).

Upon receiving the connection parameters, the client (310) determines whether the connection parameters can be enforced by the client (310) and sends an acknowledgment to the NAS (320) at S80 indicating that the client will enforce the connection parameters. However, if the client determines that the connection parameters cannot be enforced, the client (310) sends a message to the NAS (320) at S85 indicating that the connection parameters cannot be enforced or requests that the authenticated session be closed, such that the NAS (320) may release the allocated resources and close the authenticated session. Continuing the above example, the client (310) may determine that the packets per second constraint is not acceptable to one or more or more of the client's applications, and thus the connection parameters are unacceptable to the client (310) and cannot be enforced by the client (310). If the client (310) indicates that it cannot enforce the connection parameters, or if the NAS (320) determines that the client (310) is not enforcing the connection parameters, the NAS (320) transitions the client into an unauthenticated state and removes the installed policies to save hardware resources at S90.

Thus, by receiving the authenticated connection parameters from the NAS (320), the client (310) may self-enforce the network policy that is being applied by the NAS (320) so that an authenticated session can be preserved. The client applications may determine whether such traffic policies are acceptable to avoid service interruption. The cryptographic seal accompanying packets (411) and (412) ensures that the connection parameters provided by the NAS (320) to the client (310) are authentic.

Figure 5:
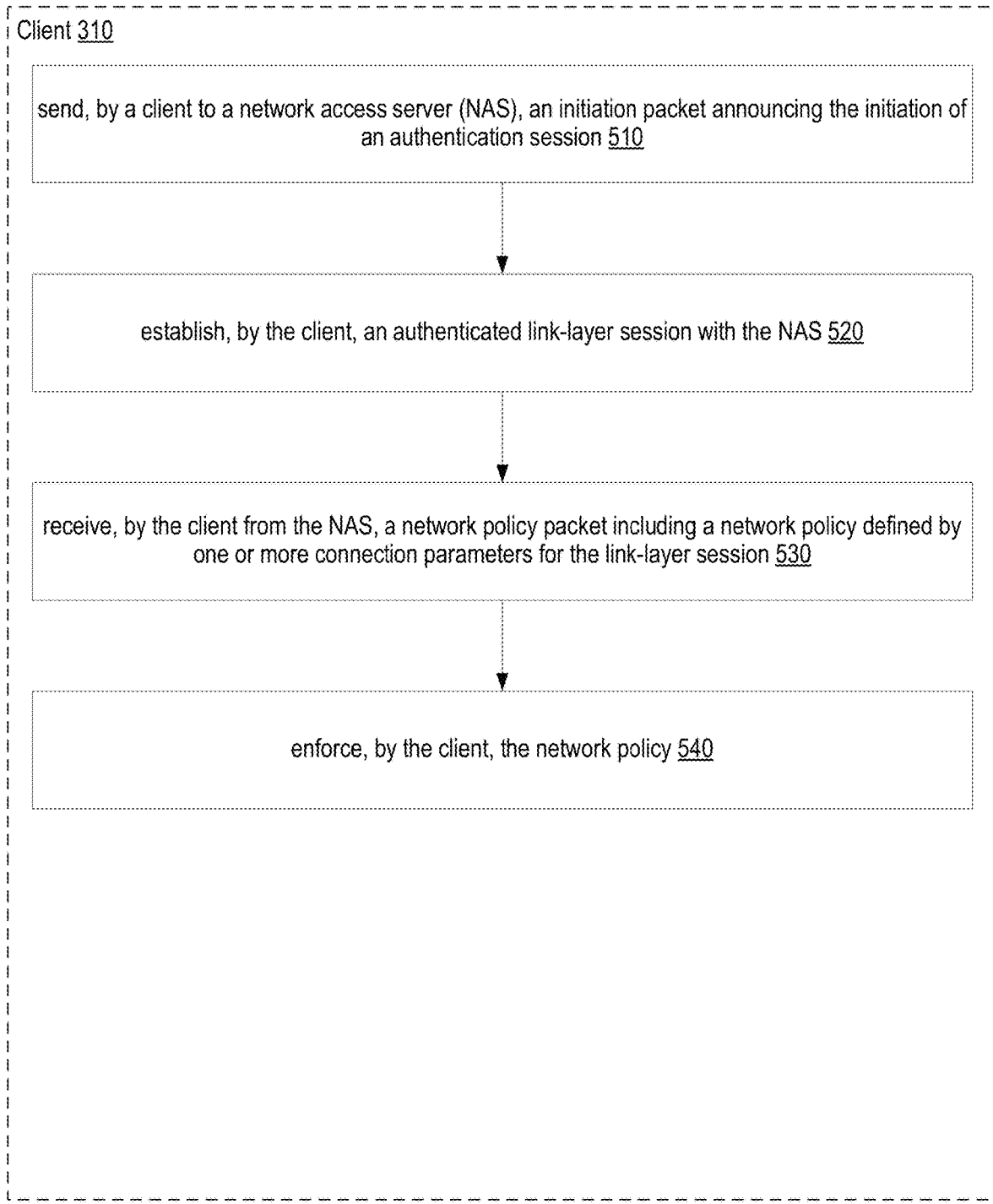
FIG. 5 is a flow chart illustrating an exemplary method according to embodiments of the present invention.

For further explanation, FIG. 5 sets forth a flow chart illustrating an exemplary method for connection parameter awareness in an authenticated link-layer network session according to embodiments of the present invention that includes sending (510), by a client to a network access server (NAS), an initiation packet announcing the initiation of an authentication session. Sending (510), by a client to a network access server (NAS), an initiation packet announcing the initiation of an authentication session may be carried out by the client (310) sending the packet (411) to the NAS (320) announcing the initiation of an authentication session. For example, the authentication process (315) of the client (310) generates a session identifier, encapsulates the session identifier in a first data structure in the packet (411), and includes in the packet (411) a second data structure encapsulating a cryptographic seal. The first and second data structures may be, for example, TLV data structures. The cryptographic seal may be applied based on a particular authentication protocol. For example, where a pre-shared key (PSK) is used to establish a trust relation, the cryptographic seal may be a hash-based message authentication code (HMAC). As another example, where an asymmetric cryptographic key pair is used for the trust relation, the cryptographic seal may be a digital signature with the client's private key. The client authentication process (315) then transmits the packet (411) to the NAS (320) using the particular authentication protocol. For example, the NAS (320) may broadcast an identifier that is discoverable by the client (310), and the authentication process (315) may generate the packet (411) and transmit the packet (411) to the NAS (320).

The method of FIG. 5 also includes establishing (520), by the client, an authenticated link-layer session with the NAS. Establishing (520), by the client, an authenticated link-layer session with the NAS may be carried out by the client authentication process (315) establishing the authenticated link-layer session with the NAS (320). In one embodiment, the NAS (320) acts as a proxy between the client (310) and the authentication server (330) to authenticate the client before initiation of the link-layer session. For example, the NAS (320) may request the identity of the client (310), and the client authentication process (315) may respond with identity information, which the NAS (320) passes to the authentication server (330) as an access request message. The authentication server (330) may then respond with a challenge for the client (310), which the NAS (320) includes in a request message to the client (310). The client authentication process (315) then provides an answer to the challenge in response message to the NAS (320), which the NAS (320) provides the authentication server (330). For example, the answer to the challenge may be a strong password, a PSK, or other secure credential that will be appreciated by those of skill in the art. Upon authentication of the client credentials, the authentication server (330) provides a response to the NAS (320) indicating that the client has been authenticated. The authentication server (330) also provides the NAS (320) with a network policy for the client (310), for example, as part of a network certificate. The network policy defines conditions, constraints, restrictions, and settings for network service that should be provided the client. The network policy is provided to the NAS (320) by the authentication server (330) for enforcement of the network policy by the NAS (320). After receiving indication that the client (310) has been authenticated, the NAS (320) transmits a response message to the client authentication process indicating that the client (310) has been authenticated and authorized for network services. It will be appreciated by those of skill in the art that the foregoing description of establishing (520), by the client, an authenticated link-layer session with the NAS (320) is presented as an example authentication, authorization, and accounting (AAA) methodology and that other AAA methodologies and authentication processes may be used. In one embodiment, the network policy includes a traffic policy for the client (310).

The method of FIG. 5 also includes receiving (530), by the client from the NAS, a network policy packet including a network policy defined by one or more connection parameters for the link-layer session. Receiving (530), by the client from the NAS, a network policy packet including a network policy defined by one or more connection parameters for the link-layer session may be carried out by the client authentication process receiving the network policy packet (412) from the NAS (320). In an embodiment, the connection parameter packet (412) includes the session identifier generated by the client authentication process (315) and provided in the initiation packet (411), as well as a cryptographic seal. Where a PSK is used, the cryptographic seal may be the same PSK that was included in the initiation packet (411). When asymmetric encryption is used, the cryptographic seal may be a digital signature such as the private key of the NAS (320). The packet (412) further includes one or more connection parameters for the network service provided to the client (310) that define a network policy that the NAS (320) will enforce for the network service provided to the client (310). In one embodiment, the network policy is a traffic policy, and the connection parameters include traffic policy constraints and settings such as bandwidth parameter (e.g., packets per second), a QoS parameter, and a VLAN setting parameter.

The method of FIG. 5 also includes enforcing (540), by the client, the network policy. Enforcing (540), by the client, the network policy may be carried out by the client (310) implementing the one or more connection parameters received from the NAS (320) in the connection parameter packet (412). For example, the client authentication process (315) may provide the one or more connection parameters to an application (317) on the client (310) that will utilize the authorized network services. The client application (317) then, with the knowledge of the constraints and conditions enforced by the NAS (320), utilizes the network service within those constraints and conditions as defined by the connection parameters in order to avoid being transitioned to an unauthenticated session by the NAS (320). As a nonlimiting example, the network policy enforced by the NAS (320) may be a traffic policy including a bandwidth connection parameter that constrains the number of packets per second that a client application (317) is authorized to transmit. In this example, the connection parameter packet (412) includes a TLV indicating that the client is allowed to transmit X packets/second. The client authentication process (315) provides the X packets/second connection parameter to the client application (317), which modifies application protocol or behavior so that the application does not exceed X packets/second. For example, the client (310) may be an IoT device and the client application (317) may be a temperature sensor application that is ordinarily configured to provide temperature sensor readings utilizing a bandwidth of 10 packets/sec. However, a traffic policy for the network (100) enforced by the NAS (320) may constrain the client application (317) to 5 packets/second. Upon receiving the bandwidth connection parameter in connection parameter packet (412) via the client authentication process (315), the client application (317) may modify the application protocol to limit the bandwidth to 5 packets/second, thereby providing client-based self-enforcement of the traffic policy.

Figure 6:
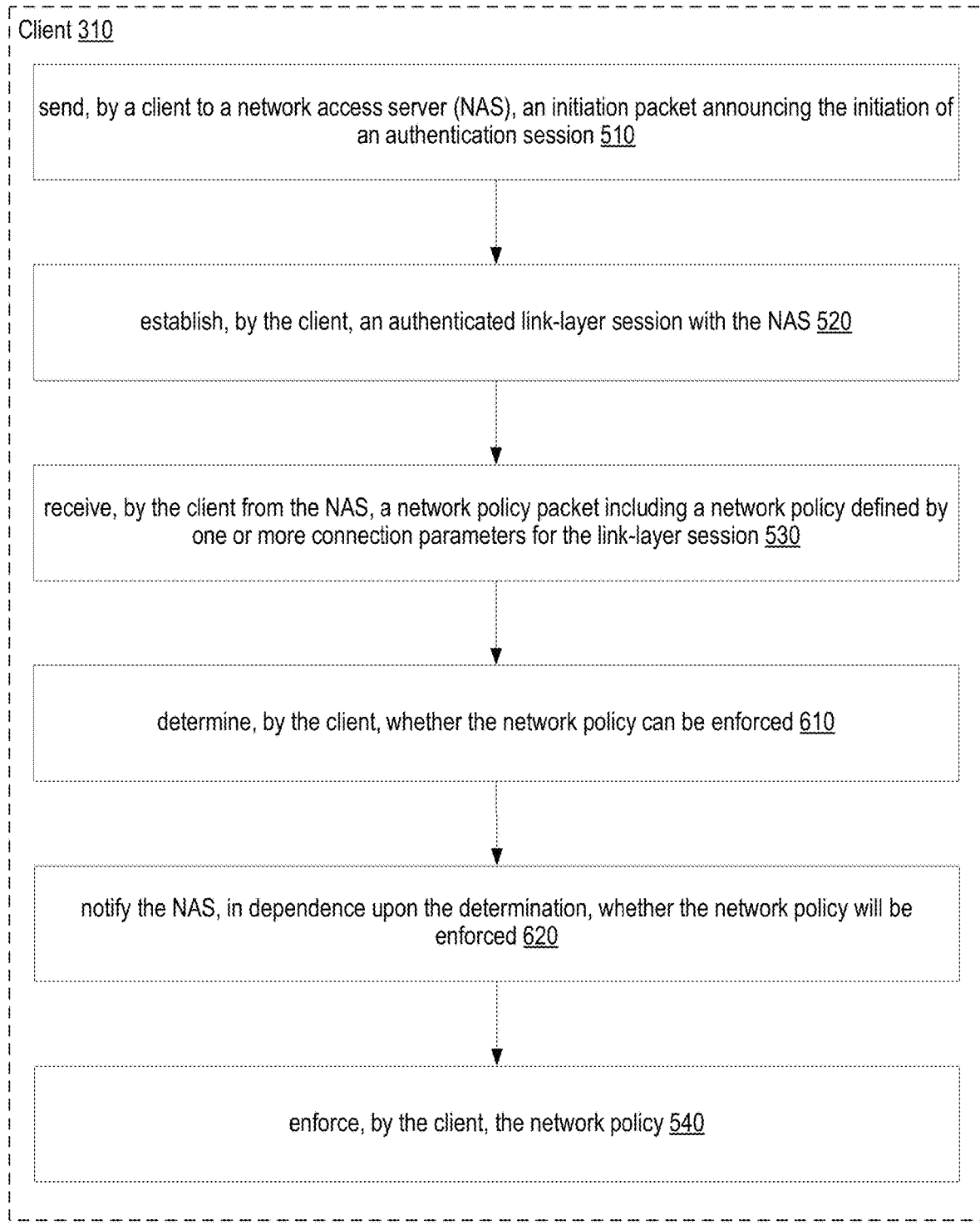
FIG. 6 is a flow chart illustrating another exemplary method according to embodiments of the present invention.

For further explanation, FIG. 6 sets forth a flow chart illustrating a further exemplary method for connection parameter awareness in an authenticated link-layer network session according to embodiments of the present invention. Like FIG. 5, FIG. 6 also includes sending (510), by a client to a network access server (NAS), an initiation packet announcing the initiation of an authentication session, establishing (520), by the client, an authenticated link-layer session with the NAS, receiving (530), by the client from the NAS, a network policy packet including a network policy defined by one or more connection parameters for the link-layer session, enforcing (540), by the client, the network policy.

The method of FIG. 6 is different from the method of FIG. 5 in that the method of FIG. 6 also includes determining (610), by the client, whether the network policy can be enforced. Determining (610), by the client, whether the network policy can be enforced may be carried out by the client (310) determining whether the one or more client applications (317) can operate within the conditions and constraints defined by the connection parameters received in the connection parameter packet (412). For example, the client (310) may determine whether each client application (317) can meet application protocol requirements while adhering to the connection parameters, or may determine that at least one client application is violating or will violate at least one connection parameter. Continuing the example of a bandwidth connection parameter, the client (310) may determine whether the client application (317) can reduce the expected bandwidth while reliability satisfying application protocol requirements. In some embodiments, after initially enforcing (540), by the client, the network policy, the method may periodically return to determining (610), by the client, whether the network policy can be enforced to reassess whether client applications (317) continue to adhere and will continue to adhere to the network policy.

The method of FIG. 6 is also different from the method of FIG. 5 in that the method of FIG. 6 further includes notifying (620) the NAS, in dependence upon the determination, whether the network policy will be enforced. Notifying (620) the NAS, in dependence upon the determination, whether the network policy will be enforced may be carried out by the client (310) transmitting an acknowledgement message to the NAS (320) upon determining that the network policy can be enforced by the client (310).

Figure 7:
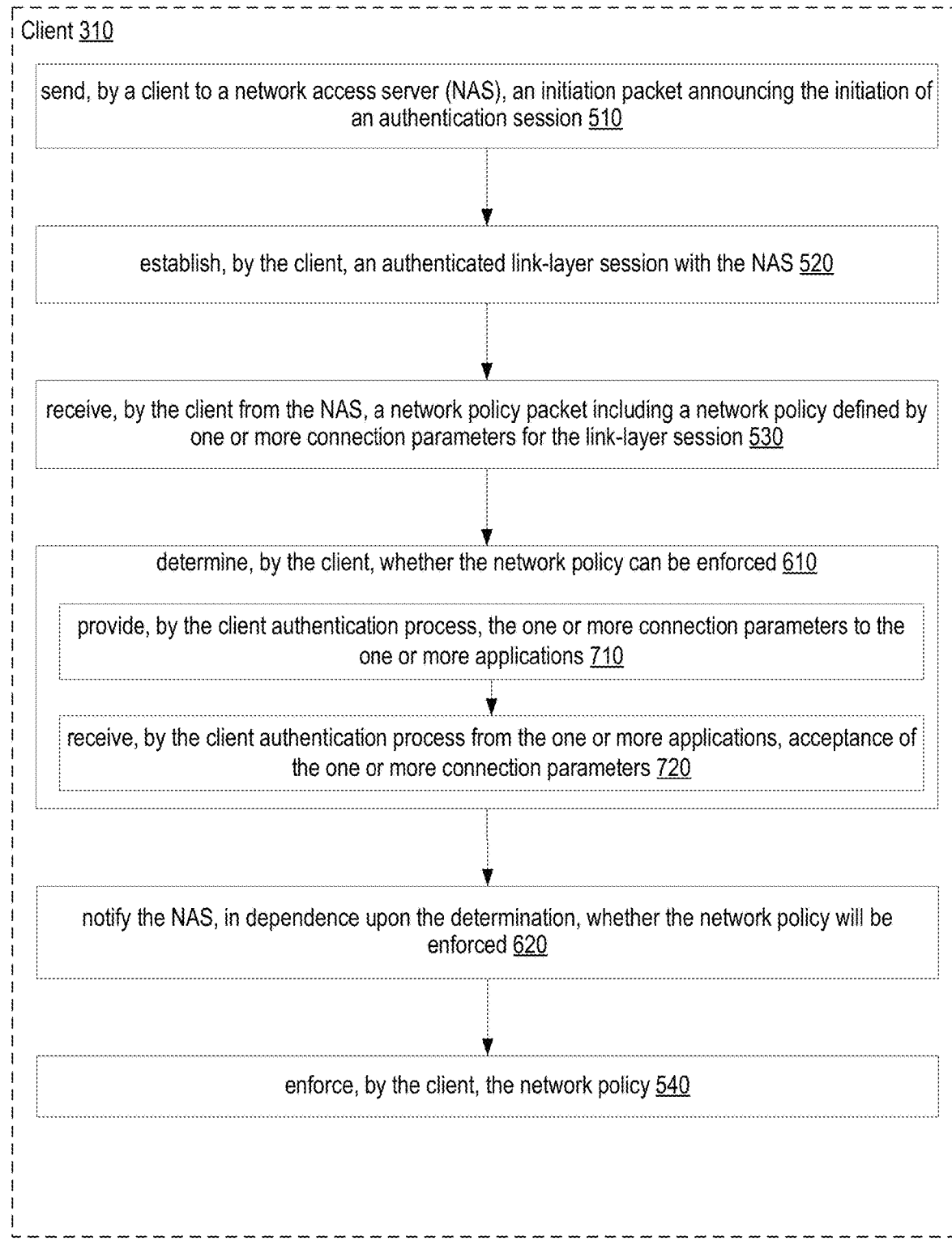
FIG. 7 is a flow chart illustrating another exemplary method according to embodiments of the present invention.

For further explanation, FIG. 7 sets forth a flow chart illustrating a further exemplary method for connection parameter awareness in an authenticated link-layer network session according to embodiments of the present invention. Like FIG. 6, FIG. 7 also includes sending (510), by a client to a network access server (NAS), an initiation packet announcing the initiation of an authentication session, establishing (520), by the client, an authenticated link-layer session with the NAS, receiving (530), by the client from the NAS, a network policy packet including a network policy defined by one or more connection parameters for the link-layer session, enforcing (540), by the client, the network policy, determining (610), by the client, whether the network policy can be enforced, and notifying (620) the NAS, in dependence upon the determination, whether the network policy will be enforced.

The method of FIG. 7 is different from the method of FIG. 6 in that determining (610), by the client, whether the network policy can be enforced includes providing (710), by the client authentication process, the one or more connection parameters to the one or more applications. Providing (710), by the client authentication process, the one or more connection parameters to the one or more applications may be carried out by the client authentication process (315) providing the connection parameters, received in the connection parameter packet (412) from the NAS (320), to the one or more client applications (317). For example, the connection parameters may be provided by the client authentication process (315) to the one or more client applications (317) as part of provisioning the client applications (317) with access to the network (100).

The method of FIG. 7 is also different from the method of FIG. 6 in that determining (610), by the client, whether the network policy can be enforced further includes receiving (720), by the client authentication process from the one or more applications, acceptance of the one or more connection parameters. Receiving (720), by the client authentication process from the one or more applications, acceptance of the one or more connection parameters may be carried out by the client authentication process (315) receiving an acknowledgement message from the one or more client applications (317) that the client application (317) can operate with the constraints of the connection parameters. For example, the client application (317) may indicate that, for example, adherence to a bandwidth constraint will not cause a failure of the client application (317).

Figure 8:
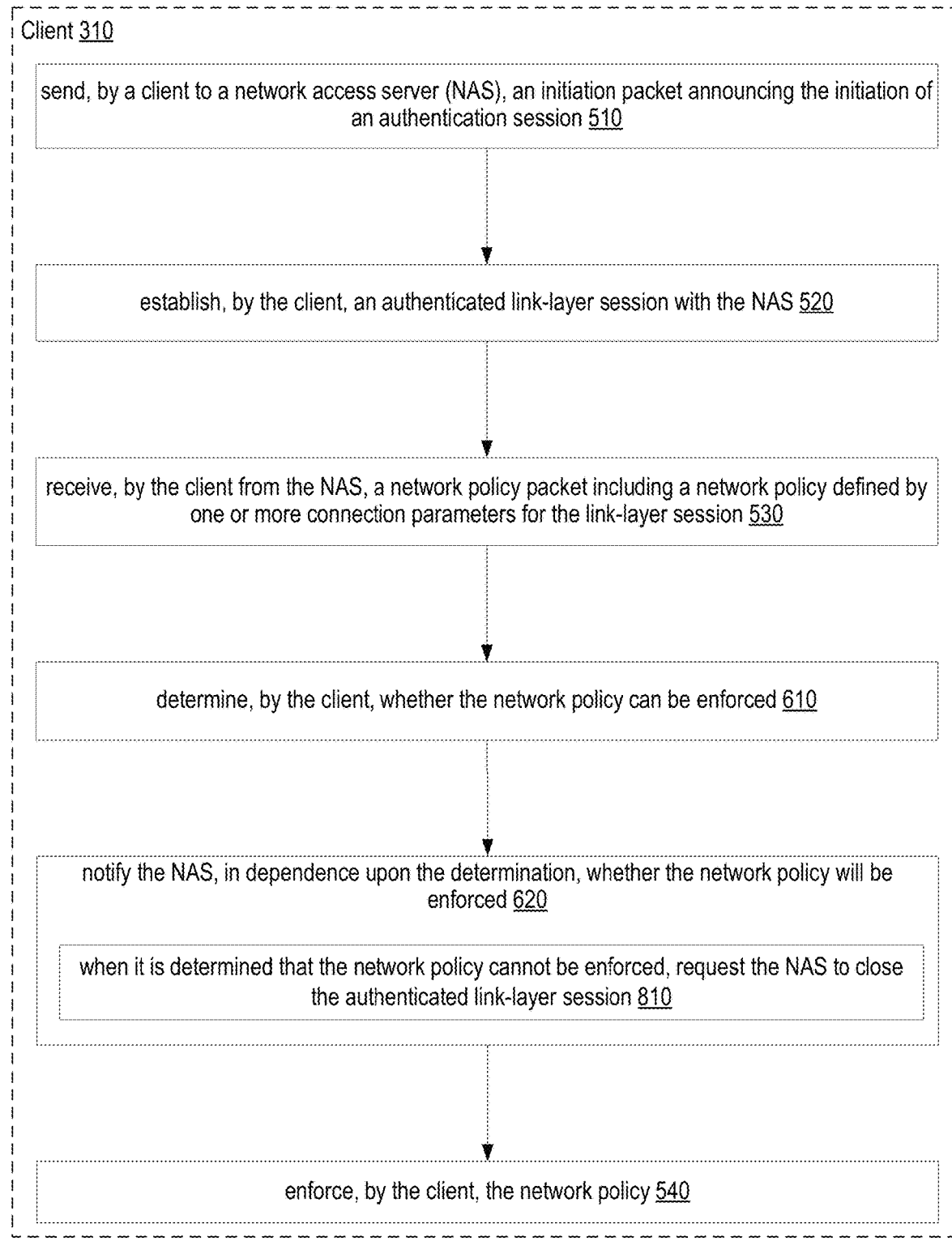
FIG. 8 is a flow chart illustrating another exemplary method according to embodiments of the present invention.

For further explanation, FIG. 8 sets forth a flow chart illustrating a further exemplary method for connection parameter awareness in an authenticated link-layer network session according to embodiments of the present invention. Like FIG. 6, FIG. 8 also includes sending (510), by a client to a network access server (NAS), an initiation packet announcing the initiation of an authentication session, establishing (520), by the client, an authenticated link-layer session with the NAS, receiving (530), by the client from the NAS, a network policy packet including a network policy defined by one or more connection parameters for the link-layer session, enforcing (540), by the client, the network policy, determining (610), by the client, whether the network policy can be enforced, and notifying (620) the NAS, in dependence upon the determination, whether the network policy will be enforced.

The method of FIG. 8 is different from the method of FIG. 6 in that notifying (620) the NAS, in dependence upon the determination, whether the network policy will be enforced includes, when it is determined that the client cannot enforce the network policy, requesting (810) the NAS to close the authenticated link-layer session. Requesting (810) the NAS to close the authenticated link-layer session may be carried out by the client authentication process (315) requesting the NAS (320) to close the authenticated session upon determining that the network policy cannot be enforced by the client (310).

Figure 9:
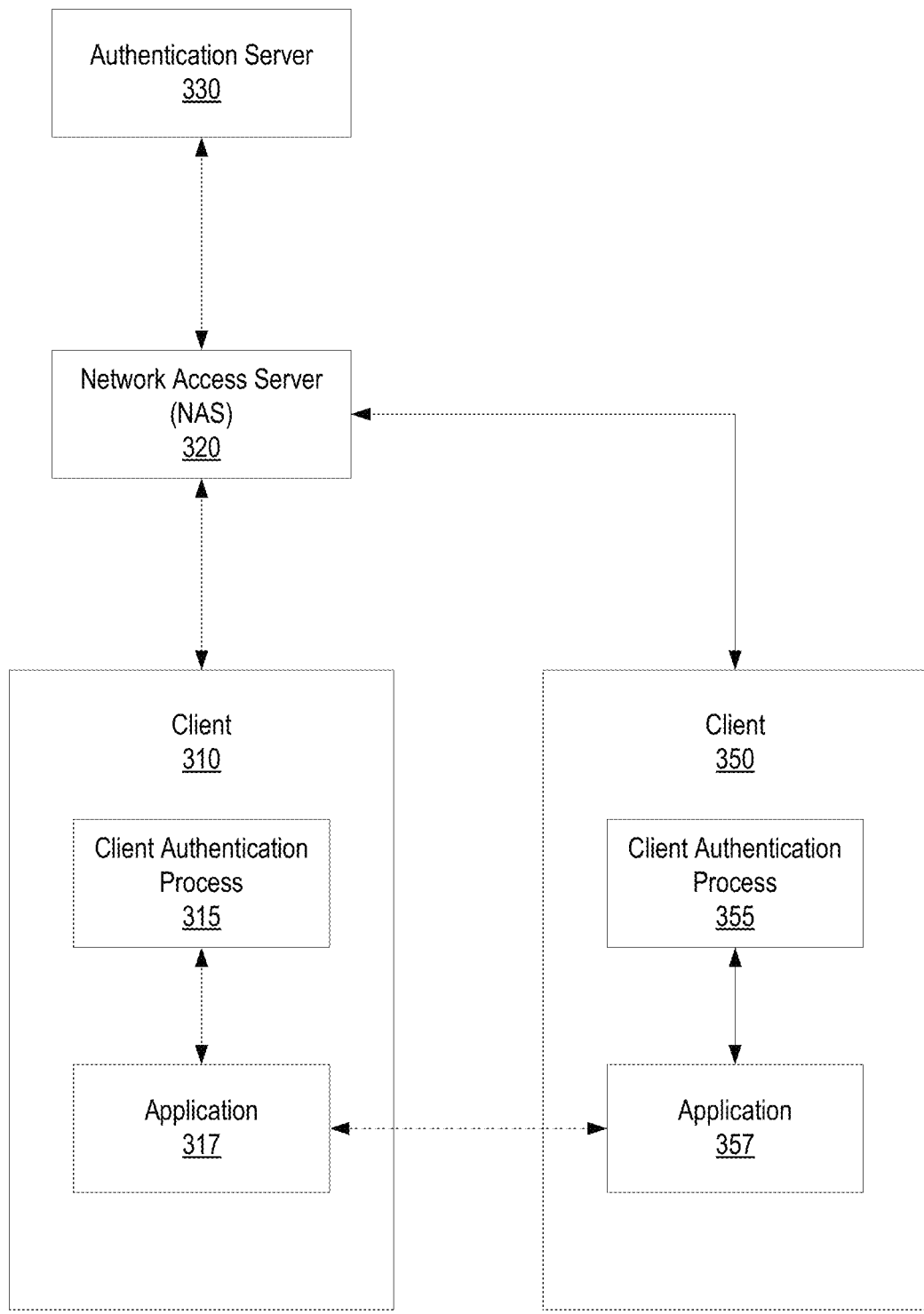
FIG. 9 is a block diagram illustrating another exemplary system according to embodiments of the present invention.

For further explanation, FIG. 3 sets forth a block diagram illustrating an exemplary configuration of entities for connection parameter awareness in an authenticated link-layer network session according to embodiments of the present invention that, like the system of FIG. 3 includes the client (310), the NAS (320), and the authentication server (330). The system of FIG. 3 is different from the system of FIG. 3 in that the system of FIG. 9 further includes a second client (350) connected to the NAS (320) and the network (100). The second client (350) may be similarly configured to the client (310), including an authentication process (355) like the authentication process (315), and including one or more second client applications (357).

Figure 10:
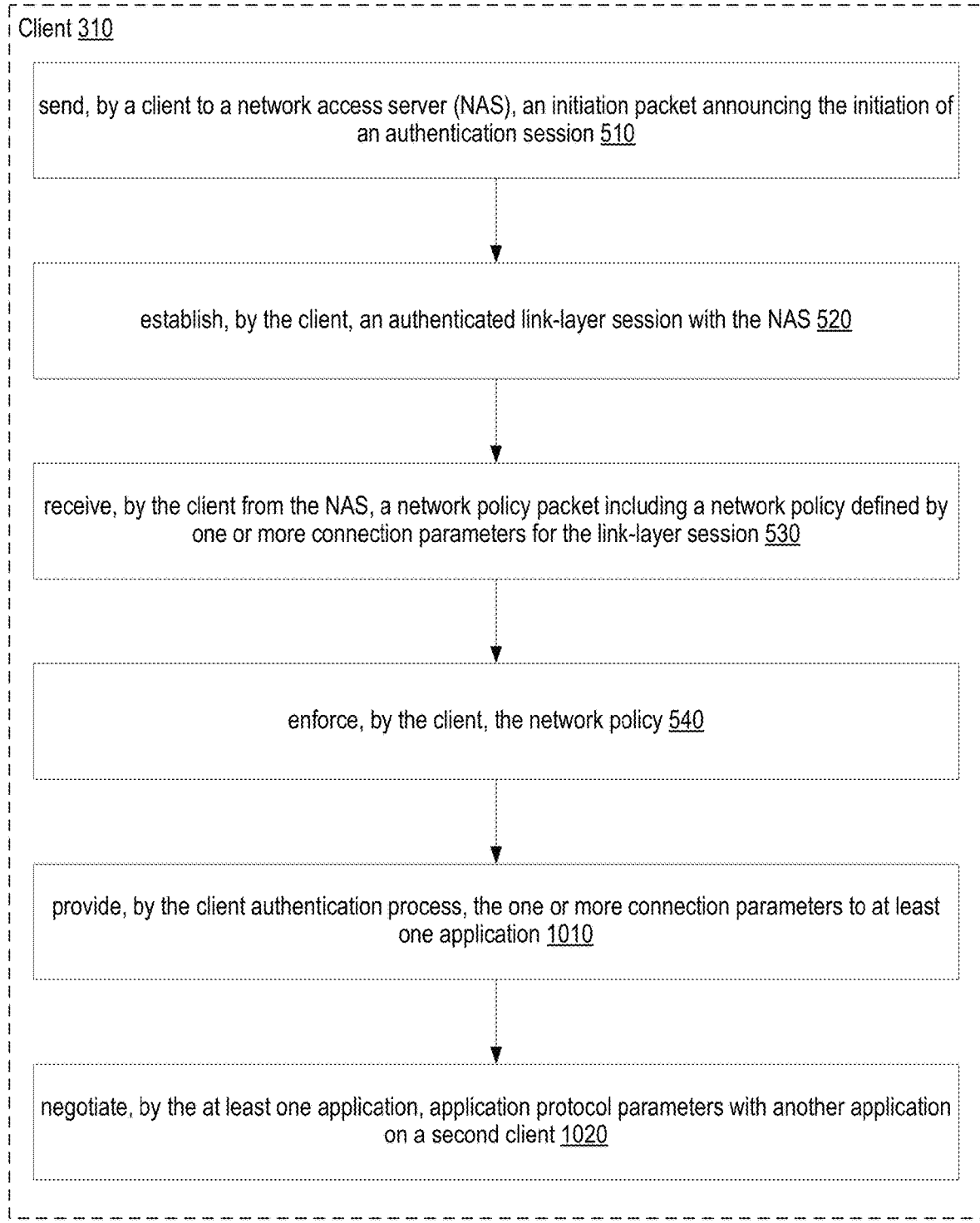
FIG. 10 is a flow chart illustrating an exemplary method according to embodiments of the present invention.

For further explanation, FIG. 10 sets forth a flow chart illustrating a further exemplary method for connection parameter awareness in an authenticated link-layer network session according to embodiments of the present invention. Like FIG. 5, FIG. 10 also includes sending (510), by a client to a network access server (NAS), an initiation packet announcing the initiation of an authentication session, establishing (520), by the client, an authenticated link-layer session with the NAS, receiving (530), by the client from the NAS, a network policy packet including a network policy defined by one or more connection parameters for the link-layer session, enforcing (540), by the client, the network policy.

The method of FIG. 10 is different from the method of FIG. 5 in that enforcing (540), by the client, the one or more network policies includes providing (1010), by the client authentication process, the one or more connection parameters to at least one application. Providing (1010), by the client authentication process, the one or more connection parameters to at least one application may be carried out by the client authentication process (315) providing the connection parameters, received in the connection parameter packet (412) from the NAS (320), to the one or more client applications (317). For example, the connection parameters may be provided by the client authentication process (315) to the one or more client applications (317) as part of provisioning the client applications (317) with access to the network (100).

The method of FIG. 10 is also different from the method of FIG. 5 in that enforcing (540), by the client, the one or more network policies further includes negotiating (1020), by the at least one application, application protocol parameters with another application on a second client. Negotiating (1020), by the at least one application, application protocol parameters with another application on a second client may be carried out by the client application (317) determining that a connection parameter affects an application protocol between the client application (317) on the client (310) and another second client application (357) on the second client (350) in the network (100). For example, the client application (317) on the client (310) may be an information producer and the second client application (357) on the second client (350) may be an information consumer. Continuing example of a temperature sensor, the second client application (357) may consume temperature sensor readings from the client application (317). A bandwidth constraint imposed by a bandwidth connection parameter may limit the rate at which the client application (317) may reliably provide information, such as temperature sensor information, to the second client application (357). The client applications (317) and (357) may then modify an existing application protocol or agree on a new application protocol that will allow the information to be shared with the client (310) while conforming to the network policy defined by the connection parameters received in connection parameter packet (412). For example, if a sensor publishes readings with a speed of 10 packets/s and a consumer expects 10 packets/s and a network policy limits the speed to 5 packets/s, the producer can notify the consumer about this restriction and thus adapt to the network policy. Thus, the consumer may accept the new rate of 5 packets/s and will not trigger retransmissions.

In view of the explanations set forth above, readers will recognize that the benefits of connection parameter awareness in an authenticated link-layer network session according to embodiments of the present invention include improvements to client authentication processes and client applications that provide awareness of network policy enforcement such that the client applications avoid service interruptions by operating with the constraints and conditions of the network policy. By receiving the authenticated connection parameters from the NAS, the client may self-enforce the network policy that is being applied by the NAS so that an authenticated session can be preserved. The client applications may determine whether such traffic policies are acceptable and negotiate modifications to application protocols with other applications based on the awareness of the network policy. The cryptographic seal accompanying the packet containing the network policy ensures that the connection parameters provided by the NAS to the client are authentic.

Exemplary embodiments of the present invention are described largely in the context of a fully functional computer system for connection parameter awareness in an authenticated link-layer network session. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of connection parameter awareness in an authenticated link-layer network session, the method comprising:
   sending, by a client to a network access server (NAS), an initiation packet announcing the initiation of an authentication session;
   establishing, by the client, an authenticated link-layer session with the NAS;
   receiving, by the client from the NAS, a network policy packet including a network policy defined by one or more connection parameters for the link-layer session; and
   enforcing, by the client and based on determining whether the network policy can be enforced, the network policy, including notifying the NAS of whether the network policy will be enforced.

2. The method of claim 1, wherein the client includes an authentication process and one or more applications; and
   wherein determining, by the client, whether the network policy can be enforced includes:
      providing, by the client authentication process, the one or more connection parameters to the one or more applications; and
      receiving, by the client authentication process from the one or more applications, acceptance of the one or more connection parameters.

3. The method of claim 1, wherein notifying the NAS, in dependence upon the determination, whether the network policy will be enforced includes, when it is determined that the client cannot enforce the network policy, requesting the NAS to close the authenticated link-layer session.

4. The method of claim 1, wherein the client includes an authentication process and at least one application, and wherein enforcing, by the client, the one or more network policies includes:
   providing, by the client authentication process, the one or more connection parameters to at least one application; and
   negotiating, by the at least one application, application protocol parameters with another application on a second client.

5. The method of claim 1, wherein the initiation packet and the network policy packet each include a cryptographic seal.

6. The method of claim 1, wherein the network policy is a traffic policy and the one or more connection parameters includes at least one of a bandwidth parameter, a quality-of-service (QoS) parameter, a virtual local area network (VLAN) parameter, and a layer 2 tunneling protocol (L2TP) parameter.

7. An apparatus for connection parameter awareness in an authenticated link-layer network session, the apparatus comprising a computer processor, a computer memory operatively coupled to the computer processor, the computer memory having disposed within it computer program instructions that, when executed by the computer processor, cause the apparatus to carry out the steps of:
   sending, by a client to a network access server (NAS), an initiation packet announcing the initiation of an authentication session;
   establishing, by the client, an authenticated link-layer session with the NAS;
   receiving, by the client from the NAS, a network policy packet including a network policy defined by one or more connection parameters for the link-layer session; and
   enforcing, by the client and based on determining whether the network policy can be enforced, the network policy, including notifying the NAS of whether the network policy will be enforced.

8. The apparatus of claim 7, wherein the client includes an authentication process and one or more applications; and
   wherein determining, by the client, whether the network policy can be enforced includes:
      providing, by the client authentication process, the one or more connection parameters to the one or more applications; and
      receiving, by the client authentication process from the one or more applications, acceptance of the one or more connection parameters.

9. The apparatus of claim 7, wherein notifying the NAS, in dependence upon the determination, whether the network policy will be enforced includes, when it is determined that the client cannot enforce the network policy, requesting the NAS to close the authenticated link-layer session.

10. The apparatus of claim 7, wherein the client includes an authentication process and at least one application, and wherein enforcing, by the client, the one or more network policies includes:
   providing, by the client authentication process, the one or more connection parameters to at least one application; and negotiating, by the at least one application, application protocol parameters with another application on a second client.

11. The apparatus of claim 7, wherein the initiation packet and the network policy packet each include a cryptographic seal.

12. The apparatus of claim 7, wherein the network policy is a traffic policy and the one or more connection parameters includes at least one of a bandwidth parameter, a quality-of-service (QoS) parameter, a virtual local area network (VLAN) parameter, and a layer 2 tunneling protocol (L2TP) parameter.

13. A computer program product for connection parameter awareness in an authenticated link-layer network session, the computer program product disposed upon a computer readable medium, the computer program product comprising computer program instructions that, when executed, cause a computer to carry out the steps of:
    sending, by a client to a network access server (NAS), an initiation packet announcing the initiation of an authentication session;
    establishing, by the client, an authenticated link-layer session with the NAS;
    receiving, by the client from the NAS, a network policy packet including a network policy defined by one or more connection parameters for the link-layer session; and
    enforcing, by the client and based on determining whether the network policy can be enforced, the network policy, including notifying the NAS of whether the network policy will be enforced.

14. The computer program product of claim 13, wherein the client includes an authentication process and one or more applications; and
    wherein determining, by the client, whether the network policy can be enforced includes:
        providing, by the client authentication process, the one or more connection parameters to the one or more applications; and
        receiving, by the client authentication process from the one or more applications, acceptance of the one or more connection parameters.

15. The computer program product of claim 13, wherein notifying the NAS, in dependence upon the determination, whether the network policy will be enforced includes, when it is determined that the client cannot enforce the network policy, requesting the NAS to close the authenticated link-layer session.

16. The computer program product of claim 13, wherein the client includes an authentication process and at least one application, and wherein enforcing, by the client, the one or more network policies includes:
    providing, by the client authentication process, the one or more connection parameters to at least one application; and
    negotiating, by the at least one application, application protocol parameters with another application on a second client.

17. The computer program product of claim 13, wherein the initiation packet and the network policy packet each include a cryptographic seal.

* * * * *